United States Patent [19]

Tilby

[11] 4,101,285
[45] Jul. 18, 1978

[54] METHODS AND APPARATUS FOR EXTRACTING JUICES FROM JUICE-LADEN SOLID MATERIALS

[76] Inventor: Sydney E. Tilby, 716 E. Ridge Pl., Victoria, British Columbia, Canada

[21] Appl. No.: 726,752

[22] Filed: Sep. 27, 1976

[51] Int. Cl. ............................................. B01d 11/02
[52] U.S. Cl. ..................................... 23/270 B; 127/6; 100/110; 100/116; 100/139; 99/536; 210/356; 210/328; 210/359
[58] Field of Search ............. 23/270 B, 270 R; 127/3, 127/4, 5, 6; 99/459, 495, 516, 536; 210/356, 328, 359; 134/60, 104; 100/104, 110, 116, 139

[56] References Cited

U.S. PATENT DOCUMENTS

| 117,635 | 8/1971 | Il ........................................... 210/359 |
| 757,296 | 4/1904 | Gibben ................................... 127/6 |
| 820,074 | 5/1906 | Spelman ................................. 127/4 |
| 1,107,925 | 8/1914 | Forster ................................ 23/270 R |
| 1,128,981 | 2/1915 | Hoffman .............................. 134/104 |
| 3,156,248 | 11/1964 | Rand ..................................... 134/60 |

FOREIGN PATENT DOCUMENTS 570,786  7/1945  United Kingdom ................ 134/104

Primary Examiner—Stephen J. Emery
Attorney, Agent, or Firm—Burns, Doane, Swecker & Mathis

[57] ABSTRACT

Apparatus and methods for extracting juice from juice-laden material are disclosed. A tank system defines a row of material treating stations. A plurality of perforated baskets are swingably mounted at respective stations, each basket being operable to receive a charge of material. A flow of liquid is conducted through the stations in juice-extracting contact with the material. A basket actuating mechanism swings each basket from its associated station into a generally inverted position above the basket of a successive station to transfer the charge of material. In one preferred embodiment of the invention the basket is articulated intermediate its ends about a floating hinge. The basket actuating mechanism collapses the basket about the floating hinge to squeeze juice from the material before the material is delivered to the basket of a successive station.

8 Claims, 16 Drawing Figures

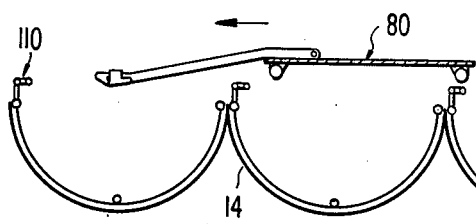
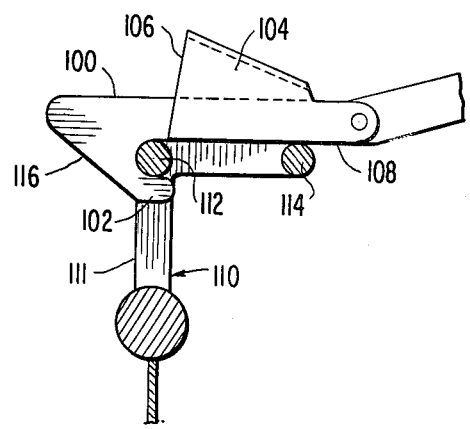
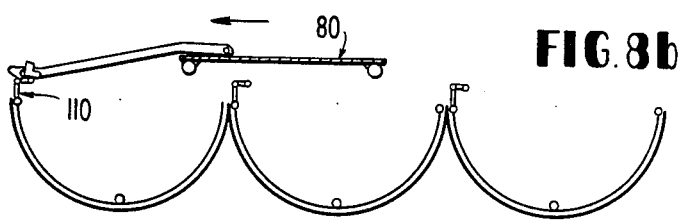
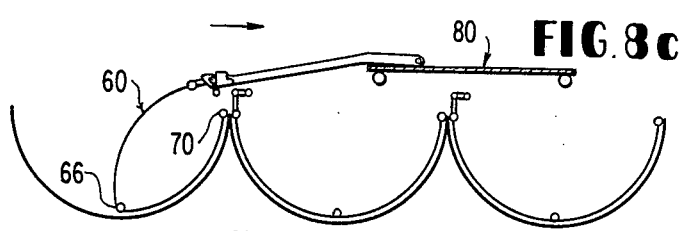
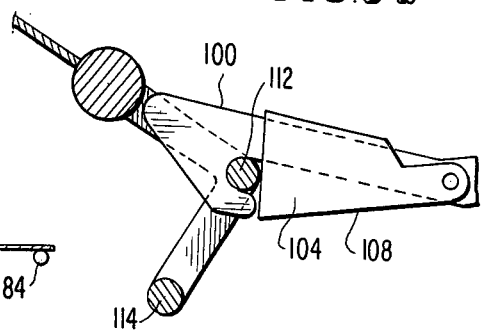
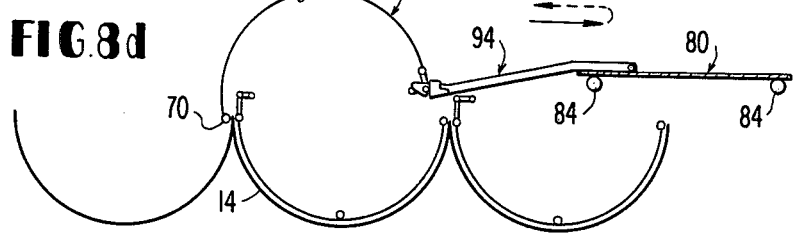
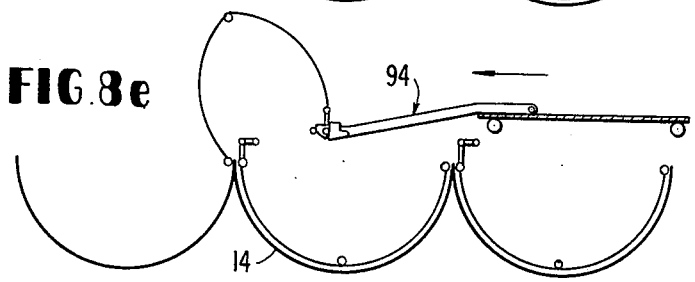
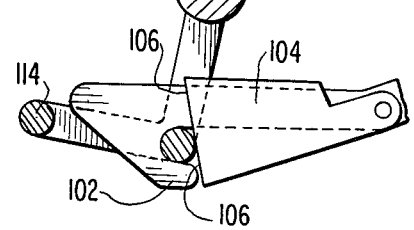
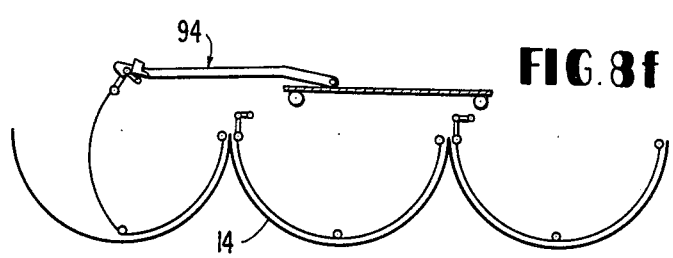
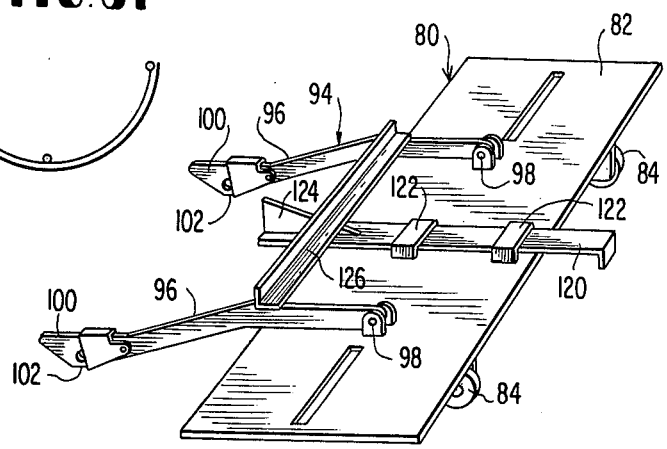

METHODS AND APPARATUS FOR EXTRACTING JUICES FROM JUICE-LADEN SOLID MATERIALS

BACKGROUND AND OBJECTS

The present invention relates to diffuser apparatus for extracting juices from juice-laden substances, especially sugarcane pith.

Many plants contain commercially valuable juices. For example, the pith component of sugarcane in its natural state is laden with sugar juice which, through suitable treatment, yields sugar. In the particular case of sugarcane, recent advances in the sugarcane processing art have enabled the recovery of sugarcane pith in an essentially natural juice-laden condition. Such advances are set forth for example, in U.S. Pat. Nos. 3,424,612 issued Jan. 28, 1969 and 3,567,510 issued Mar. 2, 1971. The ability to produce sugarcane pith in such a state has presented a unique opportunity to recover unusually high precentages of sugarcane juices with minimal processing.

In order to recover juices from sugarcane and other solid plant materials, it has been common to soak the solid material with a liquid, such as water, so as to extract soluble juices from the material into the liquid, the idea being to replace juice in the plant cells with water. Subsequently, the juice-containing liquid is treated to recover the juices. Examples of proposed diffuser apparatus may be found in U.S. Pat. No. 395,145, issued Dec. 25, 1888; U.S. Pat. No. 471,995, issued Mar. 29, 1892; U.S. Pat. No. 757,296, issued Apr. 12, 1904; U.S. Pat. No. 2,227,605, issued Jan. 7, 1941; and U.S. Pat. No. 2,567,474, issued Sept. 11, 1951. Among the various features found in previously proposed systems is the displacement of the juice-laden solid material through a liquid media. The liquid is usually in motion, with some sort of counterflow relationship between the material and liquid being established for effective juice recovery.

It has been proposed to situate a batch of the material in a compartment of a conveyor-like apparatus which revolves through reversely flowing liquid. Such operation generally involves a mininal agitation or tumbling of the product, thus limiting the efficiency of juice recovery since all portions of the material might not be subjected to the action of the liquid to the same degree.

It has also been proposed to displace a charge of the material from one liquid-filled tub to another by rotary vanes which are operably disposed in each tank. Such a system involves a high initial capital outlay and might involve a less-than-complete transfer of materials from one tank to another. Moreover, the equipment is subjected to being fouled by the liquid or materials being conveyed. In addition, material can tend to become jammed between the vanes and the tank walls, increasing the energy required to rotate the vanes.

It is, therefore, an object of the present invention to provide novel diffuser apparatus and methods for extracting juices from juice-laden solid materials.

It is another object of the invention to provide novel diffusing methods and apparatus which repeatedly tumble the materials.

It is yet another object of the invention to provide novel diffusing methods and apparatus which repeatedly tumble and squeeze the materials.

It is still a further object to provide novel diffusing methods and apparatus in which juice-laden material is repeatedly transferred between a series of tanks while being tumbled and compressed without high energy requirements and with minimal danger of equipment being fouled.

BRIEF SUMMARY

In achieving these objects, the present invention includes a tank arrangement defining a row of material-treating stations. A plurality of perforated baskets are swingably mounted at respective stations for movement into and from respective stations. Each basket is arranged to receive a charge of material to be diffused, while the basket is disposed in its associated station. Liquid conducting mechanism is provided for conducting liquid through the stations in juice-extracting contact with the material. A basket actuating mechanism is provided for swinging each basket from its associated station into a generally inverted position above the basket of a successive station to transfer the charge of materials into the basket of the successive station.

In a particularly advantageous embodiment of the present invention, each basket is articulated intermediate its ends about a floating hinge. The basket actuating mechanism is arranged to collapse the basket about the floating hinge to squeeze juice from the material before delivering the material into the basket of a successive station.

THE DRAWINGS

In the accompanying drawings, preferred embodiments of the present invention are depicted, in which:

FIG. 7 is an isometric view of a trolley for actuating the basket depicted in FIG. 6;

FIGS. 8a–8f are side elevational views depicting the sequential stages of operation of the trolley and basket; and FIGS. 9a–9c are fragmentary views depicting the sequential operation of a hook portion of the trolley.

DETAILED DESCRIPTION

Figure 1:
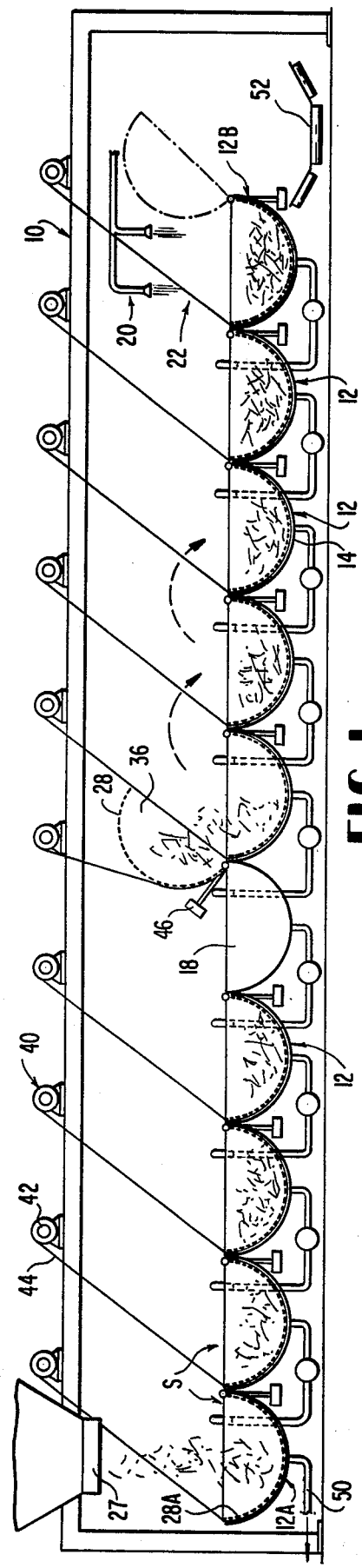
FIG. 1 is a side elevational view of a material diffuser system according to one embodiment of the invention.
Figure 2:
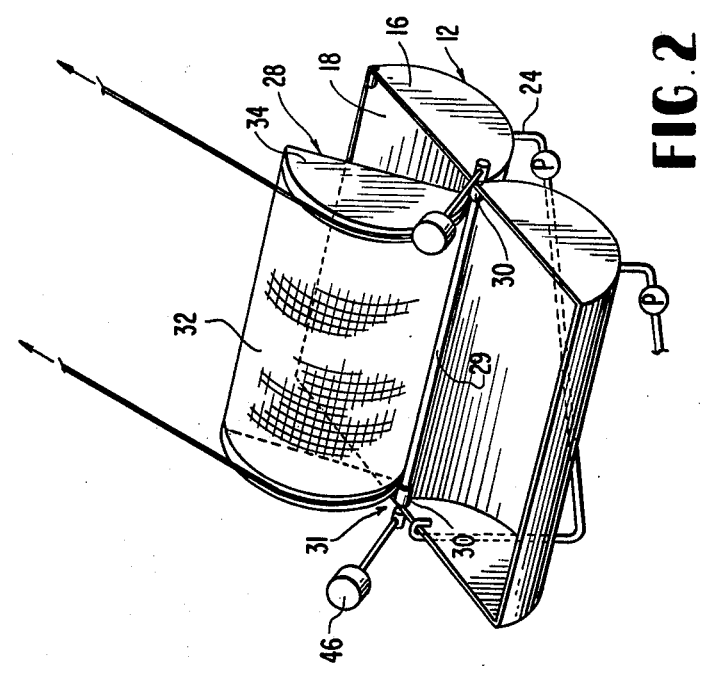
FIG. 2 is an isometric view of one form of diffuser basket in accordance with the present invention.

In FIGS. 1 and 2 a preferred sugarcane diffusing facility 10 is depicted having a series of juice extraction stations S. At each station S there is disposed a tank 12. These tanks 12, including an initial tank 12A and a terminal tank 12B, are disposed abreast of one another to form a row. The tanks 12 have a curved bottom surface 14 and base end walls 16 to define a compartment 18. The compartments 18 are operable to retain and conduct a flow of liquid, such as heated or unheated water. For example, a flow of liquid such as water may be introduced from spigots 20 into a water inlet end of the tank system (i.e., the right-hand end depicted in FIG. 1). A water flow is established through the tank system in any convenient fashion. Preferably, adjacently located tanks 12 are interconnected by a fluid conduit 24 which is arranged to conduct liquid from the bottom of one tank 12 to the top of an adjacent tank 12 (FIG. 2). In this fashion, a flow of water can be established which is directed in one general direction relative to the diffuser system, i.e., from right to left in FIG. 1. In order to facilitate this flow, each of the conduits 24 could be provided with a pump P to assist in establishing a positive flow.

It will be realized that a number of suitable arrangements are possible for establishing a flow of water through the tank system. For example, a spill-over from one tank to the next could be arranged. A sufficient head can be built up within the system to eliminate the need for pumps.

Within each tank is disposed a perforated basket 28 formed of suitably apertured material such as metal screening. The basket has an axle 29 rotatably mounted in bearing sleeves 30 affixed to the edge 31 of adjacent tanks 12. Each basket 28 includes bottom and side walls 32, 34 which define a chamber 36 capable of receiving a charge of juice-containing sugarcane pith. The baskets 28 are configured so as to nest within the respective tanks 12, and yet are pivotable so as to be capable of being raised from one tank and inverted to a pith-discharge position above an adjacent tank, as depicted in FIGS. 1 and 2. In this fashion, a charge of sugarcane pith which has been soaking in one tank may be effectively transferred to an adjacent tank 12. Successive actuation of the baskets in this manner will produce a gradual conveyance of the charge of pith toward a pith discharge end of the row of tanks (i.e., the right-hand end as depicted in FIG. 1). This direction of conveyance is opposed to the direction of fluid flow, i.e., the pith travels from left to right in FIG. 1.

Each charge of product may be introduced into the system by delivering the product from a hopper 27 into the basket of the initial tank 12A (i.e., the left-most tank of FIG. 1).

A preferred basket actuating mechanism 40 is illustrated in FIG. 1. This actuating mechanism 40 includes a winch 42 and chain 44 associated with each basket 28. There are preferably a pair of chains 44 operably connected to the associated basket. These chains extend beneath the basket 28 and are attached adjacent the bearing sleeves 29. The chains 44 are coupled to the winch 42 such that actuation of the winch 42 to take up the chains causes the chains to hoist the basket 28 from a sitting position within the tank to an inverted position, as depicted in FIGS. 1 and 2, to effect a dumping of the contents of the basket 28 into the basket of the adjoining tank.

Fixedly secured to the ends of the axle 29 of each basket 28 are counterweights 46. These counterweights 46 are operable to constantly bias the basket 28 to its pith-receiving position nested within its associated tank 12 in response to deactivation of the winch 42.

The juice flow established through the tank system (i.e., from right to left (in FIG. 1) is removed from the initial tank 12A by an exhaust conduit 50.

In operation, a charge of juice-laden sugarcane pith is introduced into the basket 28 of the initial tank 12A from the hopper 27. The pith soaks within the water-filled tank 12A such that the flow of water established from water inlet 22 toward water outlet 50 tends to extract juices from the pith, by replacing juice in the pith cells with water. Thereafter, the winch 42 associated with the tank 12A is actuated to swing the basket 28 thereof into an inverted posture over the basket 28 of a succeeding tank 12 and dump the charge of pith thereinto. During this dumping action, the pith is effectively tumbled and agitated so as to expose inner portions of the pith that may previously have been unaccessible to water contact. Raising of the liquid-filled basket from its tank is facilitated by the perforations in the basket 28 which allow the water and juices to flow back into the tank being emptied, rather than being carried into the next tank being filled.

These soaking and dumping steps are repeated until the charge of pith has traversed the entire tank system, whereupon the de-juiced pith is dumped into a discharge conveyor 52 by the basket of the terminal tank 12B.

It will be appreciated that when a condition is reached wherein each of the baskets 28 contains a charge of pith, then the baskets are actuated in sequence, starting with the basket of the terminal tank 12B and working gradually toward the initial tank 12A. After each charge of pith has been transferred to a tank, it soaks for a predetermined period within the liquid and is then advanced and tumbled into the next tank in the row, which contains a weaker solution. As liquid flows from its inlet to its outlet, it is gradually replaced by juice and thus progressively attains a higher juice content.

It will be realized that there are thus defined a row of successively disposed juice extraction stations into which a charge of sugarcane pith is sequentially tumbled and soaked so as to expose all of the pith to water contact. With the pith material being confined to travel within baskets, there is minimal danger that the equipment will become fouled or jammed.

Another preferred embodiment of the invention is depicted in FIGS. 3 through 9. In this embodiment, each of the tank-mounted baskets 60 comprises a collapsible structure. To this end, each basket 60 includes a pair of sections 62, 64 that are articulated by means of an intermediate, floating hinge 66 disposed at the adjoining ends of the basket sections 62, 64 and intermediate the ends 68, 70 of the basket as a whole. The basket sections 62, 64 are thus movable toward and away from one another between a spread position defining a chamber of given capacity, to a closed position defining a chamber of reduced capacity. In its spread position, the basket is operable to receive a charge of pith.

One of the basket sections 64 is swingably mounted about a main hinge axis 72 located at the common edge between adjacent tanks 12.

Figure 3:
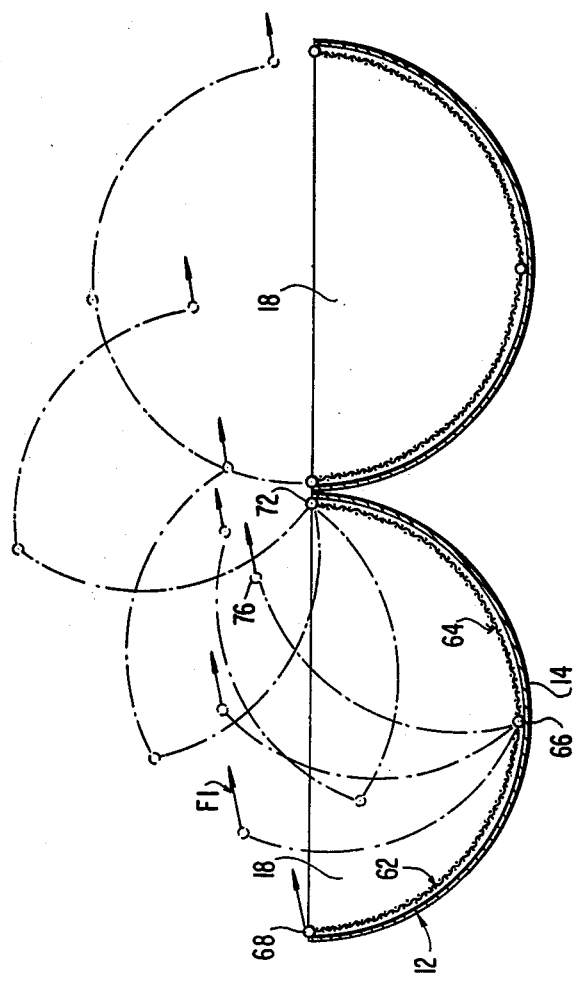
FIG. 3 is a side elevational view of an alternate form of diffuser basket according to the present invention, with sequential stages of operation being depicted in broken lines.

As shown in FIG. 3, by applying a force F1 to the free end 68 of the basket 60, the basket section 62 is swung toward the other basket section 64 about hinge 66. When the free end 68 reaches point 76 (FIG. 3), the basket defines the chamber of reduced cross section (FIGS. 3 and 8c). As this occurs, pith material within the basket is compressed. Juices squeezed therefrom fall into the tank through the perforated screen walls of the basket. Continued application of force F1 produces a swinging of the basket about the main hinge axis 72 to lift the basket from its tank and swing it to an inverted position above the succeeding tank. Here, the basket sections are spread open, allowing the squeezed pith material to be dumped into the succeeding basket for the next treatment sequence (FIGS. 3 and 8d).

Application of a force F2 in a reverse direction on the basket end causes the basket to be re-collapsed about hinge 66, swung about the axis 72 into its associated tank, and spread-open about hinge 66 to a position suitable for receiving a subsequent charge of pith material (FIGS. 8c and 8f).

The above described squeezing and dumping actions assure that the entire bulk of the pith material is subjected to both mechanical extraction (squeezing) and fluid extraction of juices at each of the extraction stations. The manner of dumping assures that the pith will be effectively tumbled and churned so that all portions of the pith are exposed to the liquid.

Numerous forms of actuating mechanisms are possible to effect the basket-collapsing and spreading functions. For example, the system disclosed in conjunction with FIGS. 1 and 2 would suffice by connecting the ends of the cables 44 to the free ends 68 of the baskets and suitably adjusting the direction of the cable to apply force F1 to the basket in a proper direction. An alternative basket actuating system is depicted in FIGS. 5–9

In the system of FIGS. 5–9 a single, traveling basket actuator is utilized to operate a plurality of baskets. As will be explained, the actuator sequentially travels from tank to tank to manipulate each basket.

Figure 6:
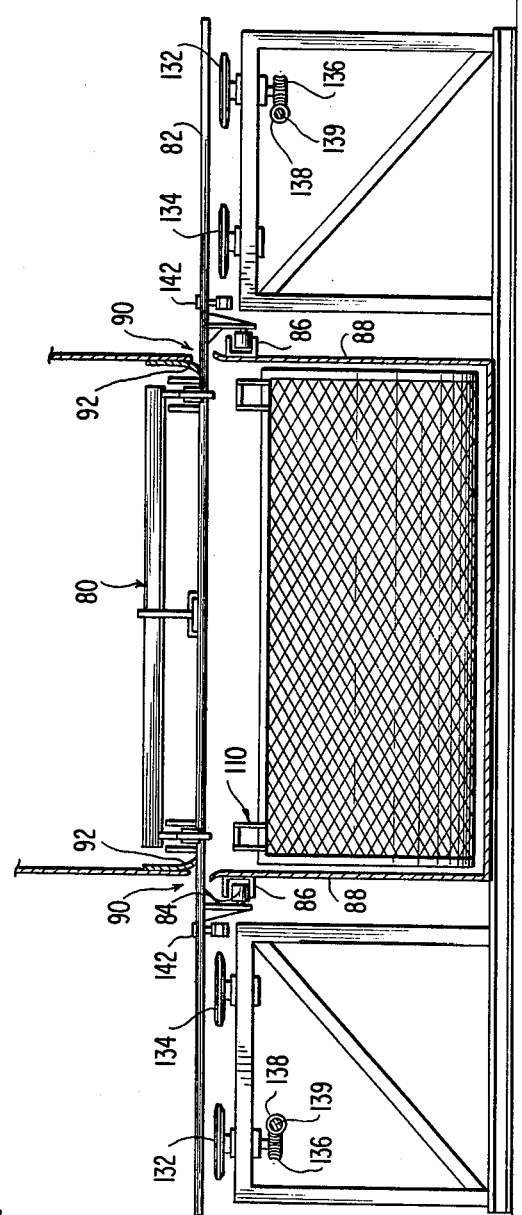
FIG. 6 is a cross-sectional view taken along line 6—6 of FIG. 5.

The traveling actuator comprises a wheeled trolley 80 (FIG. 7). The trolley 80 includes a horizontal platform 82 from which depend a plurality of wheels 84. The wheels 84 are arranged to run along spaced tracks 86 that are disposed on opposite sides of the row of tanks 12 (FIG. 6). The tracks 86 are mounted to the tank sides 88 and extend the entire length of the tank row so that the trolley can completely traverse the row.

The sides of the tanks are longitudinally slotted at 90 to accommodate the ends of the platform, which ends project outwardly of the tanks. An elongated seal strip 92 formed of suitably resilient material, such as rubber or plastic, is secured along each of the slots. The strips are each fastened to an upper tank wall portion and protect flexibly across the slots so that the strips can be raised in the region where the trolley is disposed.

Projecting forwardly from the platform 82 is a basket-grabbing mechanism 94 which includes a pair of arms 96. These arms 96 are pivotally connected at 98 to the platform for rotation in vertical planes. Downward rotational movement of the arms is limited by engagement between the undersides of the arms and the top of the platform.

At their outer ends, the arms 96 are provided with rigidly mounted, rearwardly open hooks 100 formed by rearwardly curved fingers 102 (FIG. 9). Pivotally mounted to the arms 96, adjacent the hooks 100, are movable dogs 104. The dogs 104 include a push face 106 and a cam face 108 for reasons to be discussed. The hooks 100 and dogs 104 are configured so as to operationally cooperate with a pair of basket handles 110 affixed to the free ends 68 of each basket.

Each handle 110 comprises a pair of angle brackets 111 having a pair of spaced bars 112, 114 extending between top extensions of the brackets. The forwardmost bar 112 constitutes a pull bar in that it is configured to be grabbed by the hook 100 of a respective one of the arms 96. The rearmost bar 114 constitutes a dog-release bar in that it is positioned to cam the dog to a handle-release position.

This feature is more completely understood with reference to FIG. 8. During forward movement of the trolley 80 (by drive means to be later discussed), inclined edges 116 of the hooks encounter the bars 112, 114 and thus guide the arms upwardly so that the hooks pass over the pull bars 112 (FIG. 8b). Once the hooks 100 have passed over the pull bar 112, the arms swing downwardly such that subsequent rearward movement of the trolley 80 causes the pull bars 112 to be captured by the hooks (FIGS. 8c and 9a). At this point, the dogs 104 are held in an upward, retracted position by the dog release bars 114 which contact the cam surface 108 of the dogs. Continued rearward movement of the trolley 80 enables the arms 96 to swing the basket section 62 toward the basket section 64 about the floating hinge, thereby collapsing the basket to squeeze juices from pith material contained in the basket in a first, squeezing stage of basket actuation (FIG. 8c).

In a second, lifting stage of basket actuation the basket is swung from its tank about the main pivot axis 70.

During a third, dumping stage of actuation the basket sections 62, 64 are spread open until the basket is in an inverted, open posture above the succeeding tank, whereupon all of the pith material will discharge into the succeeding tank (FIG. 8d).

As the basket section 62 is rotated during the squeezing, lifting and dumping stages of operation, the handles 110 are gradually reoriented in that the bars 112, 114 become mutually vertically spaced (FIG. 8c). This allows the dogs 104 to fall by gravity so that the pusher faces 106 close the hook and contain the pull bars 112 therein (FIGS. 8c and 9b).

At the end of the dumping stage, forward movement of the trolley brings the pusher faces 106 of the dogs 104 into engagement with the pull bars 112. Continued forward movement of the trolley causes the dog 104 to push the free end 68 of the basket and restore the basket to its upwardly open, spread posture in a fourth, return stage of operation. During this return movement, the release bar 114 approaches and assumes a horizontally spaced relationship with the pull bar 112 and cams the dog to its released, position (FIG. 8f). Continued forward movement of the arms 96 releases the handles and allows the trolley 80 to proceed to the next extracting station.

Similar squeezing, lifting, dumping and return operations are then carried out until the trolley 80 has sequentially dumped all of the baskets.

Figure 5:
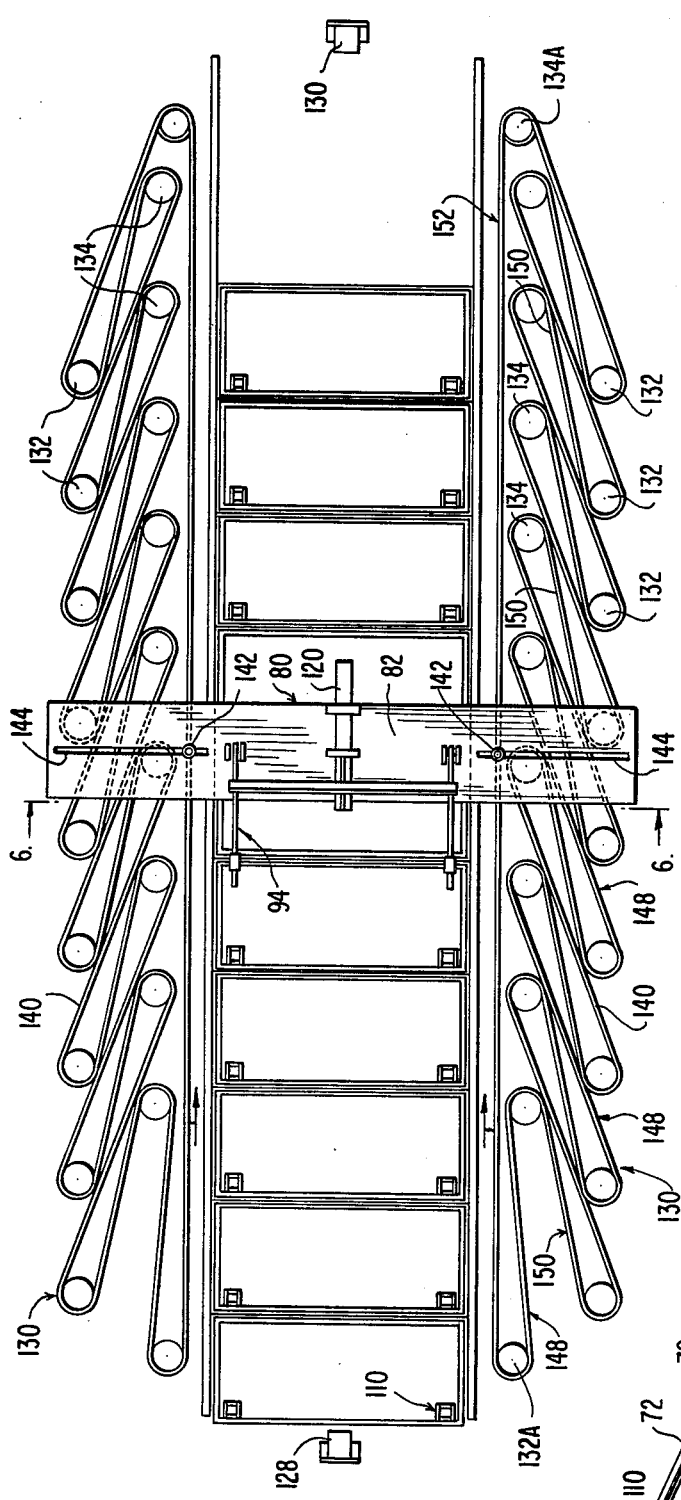
FIG. 5 is a plan view of a diffuser system employing the basket depicted in FIGS. 3 and 4.
Figure 4:
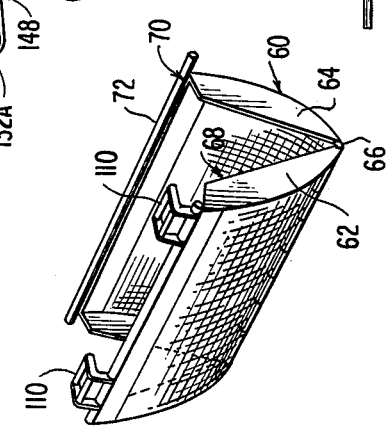
FIG. 4 is an isometric view of the basket depicted in FIG. 3.

When the trolley 80 reaches the end of its forward travel, the arms 96 are swung upwardly to a retracted position, allowing the trolley to return to the beginning of the row of tanks to initiate a new series of basket dumping operations. This arm retraction is achieved by a slidable member 120 which is slidably mounted in guide brackets 122 fixed to the platforms (FIG. 7). At its forward end, the slide 120 has a wedge plate 124 which is operable to slide beneath and raise an arm interconnecting member 126. A pair of bumpers 128, 130 are fixed at each end of the row of tanks to sequentially engage opposite ends of the slide (FIG. 5). Thus, when the trolley 80 reaches the forward limit of trolley travel, the front end of the side 120 abuts the front bumper 128, and the wedge plate 124 lifts the actuator arms 96 to clear such arms for return movement. At the rearward extent of trolley travel and the rear slide end abuts the rear bumper 130 to displace the slide forwardly and thereby lower the actuator arms.

The drive mechanism for the trolley will now be described in conjunction with FIGS. 5 and 6. At each side of the row of tanks a drive assembly 130 is disposed. Each drive assembly includes a series of advance pulleys 132 and a series of reverse pulleys 134. Each advance pulley is connected to a rotary gear 136 which is driven by a worm gear 138, the worm gears being mounted for collective rotation on a common axle 139.

Each drive assembly 130 further includes an endless belt 140 wrapped around the advance and reverse pulleys 132, 134. Extending upwardly from each belt 140 is a drive pin 142 received within a slot 144 in the trolley platform 82.

Each belt 140 thus forms a plurality of advance flights 148 from a reverse pulley 134 toward an advance pulley 132, a plurality of reverse flights 150 from an advance pulley 132 toward a reverse pulley 134, and one return flight 152 from the last advance pulley 132A to the first reverse pulley 134A.

Thus, it will be appreciated that as the drive pins 142 travel along one of the advance flights 148 of the belts, the trolley 80 will be driven forwardly. Such forward movement causes the actuating arms to engage the handles 110 of a basket (FIGS. 8a–8b). Travel of the drive pins 142 along a succeeding reverse flight 150, causes the pins to drag the trolley 80 rearwardly, thereby transferring the basket through its squeezing, lifting, and dumping stages (FIGS. 8c–8d). During further travel of the pins 142 along the succeeding advance flight, the arms 96 return the basket to its upwardly open spread position and advance forwardly to capture the handles of the next basket (FIGS. 8e–8a).

This sequencial operation continues until the pins 142 travel around the last advance pulley 132A, whereupon the drive pins travel along the return flight 152 to return the trolley 80 to the starting point.

The worm gears 138 are driven at a speed commensurate with the desired diffusion period for the pith material.

It should be noted that instead of utilizing one trolley to service all of the extractor stations, a plurality of trolleys could be deployed, each servicing a prescribed number of stations.

By virtue of the embodiment of the invention disclosed in conjunction with FIGS. 3–9, the pith material is repeatedly squeezed and tumbled during successive diffusing stations so as to maximize the extraction of juices therefrom. It will be realized that the power which is expended in transferring each basket from its associated tank is transmitted into a squeezing action on the pith. Thus, by means of a minimal expenditure of energy, a highly effective juice expression action is obtained. By tumbling the pith each time that it is transferred into the next basket, it is assured that by the time the pith has traversed the entire row of extraction stations all portions of the pith will have been exposed to the diffusing action of the liquid.

SUMMARY OF MAJOR ADVANTAGES AND SCOPES OF THE INVENTION

The diffuser system according to the present invention functions to effectively convey juice-containing material successively through a series of diffuser stations with a minimal expenditure of energy. The perforated baskets assure the complete transfer of materials from one tank to another with a vigorous tumbling action. The materials are effectively contained within baskets to minimize possible fouling and jamming of equipment.

The system eliminates the need to provide separate mechanism for loading or unloading each basket and for returning each basket to a starting point for re-loading at the end of the cycle.

The collapsible basket 60, with its floating hinge 66, enables the transfer energy to be effectively transmitted into a material squeezing action The collapsible basket 60, with its floating hinge 66, enables the transfer energy to be effectively transmitted into a material squeezing action which intensifies the overall juice extracting benefits. Thus, maximum diffusing effects are produced by minimal energy expenditures, with the continued assurance that the product will be effectively tumbled and agitated throughout its trip through the diffuser system.

The transfer trolley 80 enables a single transfer device to service a plurality of extracting stations, thus minimizing the cost of the diffuser system.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Diffuser apparatus for extracting juice from juice-laden material comprising:
   tank means defining a row of successive material treatment stations;
   a perforated basket associated with each of said stations;
   each basket being mounted for movement into and from its associated treatment station;
   each basket including sections which are collapsible about a hinge axis disposed between said sections from an open condition defining an open chamber of given volume capacity to a collapsed chamber of reduced volume capacity;
   each basket being operable to receive a charge of said material while in said open condition;
   means for conducting a flow of liquid through said tank means to extract juice from said material; and
   basket actuating means for applying a transfer force to each basket in a direction to sequentially:
   collapse each basket to compress material contained therein so as to squeeze juice therefrom; and
   transfer each basket means from its associated station to a generally inverted position over a succeeding station to discharge said charge of compressed material.

2. Diffuser apparatus according to claim 1 wherein each basket comprises at least two separate sections joined together by a hinge which defines said hinge axis and which constitutes a floating hinge; one of said sections being pivotally mounted to permit movement of said basket relative to its associated treatment station; said basket actuating means being connectable to the other of said sections to sequentially swing said other section toward said one section about said floating hinge to collapse said basket, swing said basket from its associated treatment station about the pivotal mounting of said one section, and reopen said sections in inverted posture above a succeeding treatment station.

3. Diffuser apparatus according to claim 2 wherein said tank means comprises a plurality of tanks, each tank defining a treatment station, said conducting means being arranged to conduct said fluid in a direction generally opposite the direction of movement of said charge of material between successive treatment stations.

4. Diffuser apparatus according to claim 2 wherein said basket actuating means comprises a trolley mounted for movement along said stations; said trolley including arm means for engaging and swinging each basket to said inverted position, and drive means for transporting said trolley from station to station for sequential actuation of each basket.

5. Diffuser apparatus according to claim 4 wherein said trolley includes a wheeled platform; said arm means being pivotally mounted to said platform for up and down movement; each basket including a handle having spaced first and second bars, the outer end of said arm means including a hook arranged to capture said first bar as said arm means is cammed upwardly and over said bracket during advancement of said platform; a dog being pivotally mounted to said arm means adjacent said hook; said second bar being arranged to hold said dog in an upward release position while said basket is seated in its respective station; said hook being configured to swing said basket from its associated station during reverse trolley movement such that the position of said second bar shifts allowing said dog to move to a locking position to restrain said first bar as said basket assumes its inverted position above an adjacent station; said dog being arranged to engage and push said first bar forwardly during subsequent advancement of said platform to return said basket to its associated station until being cammed to a release position by said second bar, whereupon said arm means if free to advance to the next basket.

6. Diffuser apparatus according to claim 5 wherein said platform includes at least one slot extending transverse to the direction of travel of said trolley; said drive means comprising a belt having a pin slidably disposed in said slot such that transverse movement of said pin parallel to the direction of trolley movement is transmitted to said platform; a series of pulleys around which said belt is mounted for travel; said pulleys being arranged to produce alternate advancement and reverse movements of said platform to advance said trolley to a basket capturing position, reverse said trolley to a basket-inverting position, and readvance said trolley to return said basket to its associated station and therebeyond to the next basket wherein said steps are repeated until said trolley has reversed said row of stations.

7. Diffuser apparatus according to claim 6 including a member movably mounted on said platform; a pair of bumpers located at the ends of the row of stations for contacting and shifting said movable member in opposite directions; said movable member including means for raising said arm means when said trolley has advanced and dumped all of said baskets and said movable member has been shifted by one of said bumpers; said drive belt including a return flight for returning said trolley to its starting position, whereupon the other of said bumpers shifts said movable member to lower said arm means.

8. Diffuser apparatus according to claim 1, wherein said basket is articulated intermediate its ends about floating hinge means, and said basket actuating means is arranged to collapse said basket about said floating hinge means to squeeze juice from said material before the material is delivered to the basket of a successive station.

* * * * *